United States Patent
Kanzaka et al.

(10) Patent No.: US 12,480,524 B2
(45) Date of Patent: Nov. 25, 2025

(54) IMPELLER OF CENTRIFUGAL COMPRESSOR, CENTRIFUGAL COMPRESSOR INCLUDING THE IMPELLER, AND METHOD FOR PRODUCING THE IMPELLER

(71) Applicant: MITSUBISHI HEAVY INDUSTRIES ENGINE & TURBOCHARGER, LTD., Sagamihara (JP)

(72) Inventors: Tadashi Kanzaka, Tokyo (JP); Yutaka Fujita, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 251 days.

(21) Appl. No.: 17/909,927

(22) PCT Filed: Mar. 24, 2020

(86) PCT No.: PCT/JP2020/012950
§ 371 (c)(1),
(2) Date: Sep. 7, 2022

(87) PCT Pub. No.: WO2021/192019
PCT Pub. Date: Sep. 30, 2021

(65) Prior Publication Data
US 2024/0200569 A1 Jun. 20, 2024

(51) Int. Cl.
*B23C 3/18* (2006.01)
*B23P 15/04* (2006.01)
(Continued)

(52) U.S. Cl.
CPC .............. *F04D 29/324* (2013.01); *B23C 3/18* (2013.01); *B23P 15/04* (2013.01); *F04D 29/284* (2013.01)

(58) Field of Classification Search
CPC ........ F04D 29/284; F04D 29/324; B23C 3/18
See application file for complete search history.

(56) References Cited

U.S. PATENT DOCUMENTS

| 2,962,941 A | 12/1960 | Stein et al. |
| 2010/0322781 A1 | 12/2010 | Heyes et al. |
| 2016/0010657 A1* | 1/2016 | Kimura ................. F04D 25/024 415/203 |

FOREIGN PATENT DOCUMENTS

| CN | 101952603 A | 1/2011 |
| CN | 103906895 A * | 7/2014 ............. F01D 1/026 |

(Continued)

OTHER PUBLICATIONS

English translation of JP2013213504 by PE2E May 7, 2024.*
(Continued)

*Primary Examiner* — Deming Wan
(74) *Attorney, Agent, or Firm* — Birch, Stewart, Kolasch & Birch, LLP

(57) ABSTRACT

An impeller of a centrifugal compressor includes: a plurality of blades each of which has a leading edge, a trailing edge, a pressure surface and a suction surface extending between the leading edge and the trailing edge, and a shroud-side end and a hub-side end defining the pressure surface and the suction surface together with the leading edge and the trailing edge. The pressure surface and the suction surface are each configured such that a blade element connecting the shroud-side end and the hub-side end is linear. The trailing edge is configured such that an outer diameter at the shroud-side end is larger than an outer diameter at the hub-side end, the trailing edge having a convex shape with respect to an imaginary straight line connecting the shroud-side end and the hub-side end in the trailing edge.

1 Claim, 6 Drawing Sheets

(51) Int. Cl.
*F04D 29/28* (2006.01)
*F04D 29/32* (2006.01)

(56) References Cited

FOREIGN PATENT DOCUMENTS

| | | | |
|---|---|---|---|
| CN | 105164427 A | 12/2015 | |
| EP | 2 252 798 B1 | 9/2018 | |
| JP | 47-19804 U | 11/1972 | |
| JP | 7-4389 A | 1/1995 | |
| JP | 2002-332993 A | 11/2002 | |
| JP | 2009221984 A * | 10/2009 | ........... F04D 29/284 |
| JP | 2010-133254 A | 6/2010 | |
| JP | 2011-512479 A | 4/2011 | |
| JP | 2013213504 A * | 10/2013 | ............. F04D 29/30 |
| JP | 2015-194091 A | 11/2015 | |
| JP | 2017-180094 A | 10/2017 | |
| WO | WO 2015/002066 A1 | 1/2015 | |

OTHER PUBLICATIONS

English translation of JP 2009221987 by PE2E Sep. 13, 2024.*
English translation of CN 103906895 by PE2E Sep. 13, 2024.*
International Preliminary Report on Patentability and English translation of the Written Opinion of the International Searching Authority for International Application No. PCT/JP2020/012950, dated Oct. 6, 2022.
International Search Report for International Application No. PCT/JP2020/012950, dated Jun. 2, 2020.
Chinese Office Action and Search Report for Chinese Application No. 202080098557.7, dated Jul. 26, 2025.
German Office Action for German Application No. 11 2020 006 345.3, dated Aug. 12, 2025, with English translation.

* cited by examiner

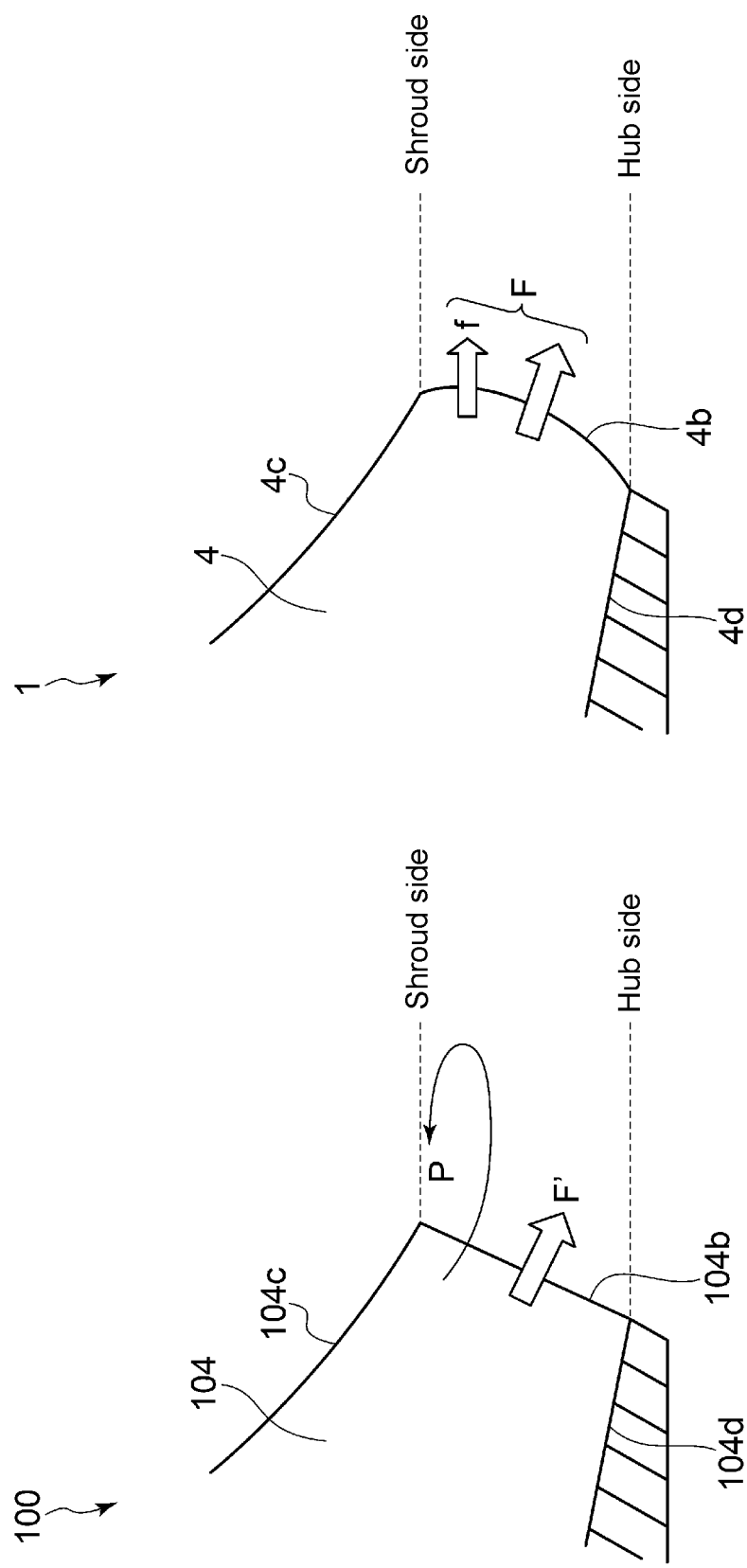

IMPELLER OF CENTRIFUGAL COMPRESSOR, CENTRIFUGAL COMPRESSOR INCLUDING THE IMPELLER, AND METHOD FOR PRODUCING THE IMPELLER

TECHNICAL FIELD

The present disclosure relates to an impeller of a centrifugal compressor, a centrifugal compressor including the impeller, and a method for producing the impeller.

BACKGROUND

As a means for increasing the pressure ratio of a centrifugal compressor, a method for increasing the peripheral speed by increasing an outer diameter of the impeller is effective. However, increasing the outer diameter of the impeller adversely affects mountability of the centrifugal compressor and may cause a fatigue failure due to the increase in peripheral speed. Thus, as disclosed in Patent Documents 1 and 2, a configuration, where an outer diameter on a shroud side is larger than an outer diameter on a hub side, is adopted as an effective means.

CITATION LIST

Patent Literature

Patent Document 1: JP2009-221984A
Patent Document 2: JP2011-512479A (translation of a PCT application)

SUMMARY

Technical Problem

However, as in the configuration described in Patent Document 1, if a trailing edge of an impeller has a linear shape connecting a shroud-side end and a hub-side end, in a flow downstream of the impeller, separation may occur on a shroud side on a high flow rate side and efficiency may decrease. On the other hand, as in the configuration described in Patent Document 2, if the trailing edge includes a curved convex portion, although it is possible to reduce the possibility that separation occurs on the shroud side on the high flow rate side, in order to produce such impeller, it is generally required to perform point cutting of cutting with a tip of a cutting tool, which may lead to an increase in cutting time.

In view of the above, an object of at least one embodiment of the present disclosure is to provide an impeller of a centrifugal compressor, a centrifugal compressor including the impeller, and a method for producing the impeller, which are capable of increasing the pressure ratio, suppressing a decrease in efficiency on the high flow rate side, and shortening a cutting work time.

Solution to Problem

In order to achieve the above object, an impeller of a centrifugal compressor according to the present disclosure includes: a plurality of blades each of which has a leading edge, a trailing edge, a pressure surface and a suction surface extending between the leading edge and the trailing edge, and a shroud-side end and a hub-side end defining the pressure surface and the suction surface together with the leading edge and the trailing edge. The pressure surface and the suction surface are each configured such that a blade element connecting the shroud-side end and the hub-side end is linear. The trailing edge is configured such that an outer diameter at the shroud-side end is larger than an outer diameter at the hub-side end, the trailing edge having a convex shape with respect to an imaginary straight line connecting the shroud-side end and the hub-side end in the trailing edge.

Further, in a method for producing an impeller of a centrifugal compressor, the impeller includes a plurality of blades each of which has a leading edge, a trailing edge, a pressure surface and a suction surface extending between the leading edge and the trailing edge, and a shroud-side end and a hub-side end defining the pressure surface and the suction surface together with the leading edge and the trailing edge, the method includes a step of forming each of the plurality of blades. The step of forming each of the plurality of blades includes: a step of line cutting the pressure surface and the suction surface such that a blade element connecting the shroud-side end and the hub-side end is linear; and a step of forming the trailing edge by removing a part of the blade, such that the trailing edge has a convex shape with respect to an imaginary straight line connecting the shroud-side end and the hub-side end in the trailing edge.

Advantageous Effects

With the impeller of the centrifugal compressor and the method for producing the impeller of the present disclosure, since the outer diameter of the trailing edge at the shroud-side end is larger than the outer diameter of the trailing edge at the hub-side end, it is possible to increase the pressure ratio. Further, since the trailing edge has the convex shape with respect to the imaginary straight line connecting the shroud-side end and the hub-side end in the trailing edge, it is possible to suppress that the flow having passed through the trailing edge is biased toward the hub on the high flow rate side, and to reduce the possibility of the separation occurring on the shroud side. Accordingly, it is possible to suppress the decrease in efficiency on the high flow rate side. Furthermore, since the pressure surface and the suction surface are each configured such that the blade element connecting the shroud-side end and the hub-side end is linear, the pressure surface and the suction surface can be line cut, making it possible to shorten the cutting work time.

BRIEF DESCRIPTION OF DRAWINGS

FIG. 6 is a view for describing an air flow in the centrifugal compressor including the impeller according to an embodiment of the disclosure.

DETAILED DESCRIPTION

Hereinafter, an impeller of a centrifugal compressor and a method for producing the impeller according to the embodiments of the present disclosure will be described with reference to the drawings. The embodiments each indicate one aspect of the present disclosure, do not intend to limit the disclosure, and can optionally be modified within a range of a technical idea of the present disclosure.

An impeller according to some embodiments of the present disclosure described below will be described by taking an impeller provided in a centrifugal compressor of a turbocharger as an example. However, the centrifugal compressor in the present disclosure is not limited to the centrifugal compressor of the turbocharger, and may be any centrifugal compressor operating independently. In the following description, a fluid compressed by the centrifugal compressor is air. However, the fluid can be replaced with any fluid.

<Configuration of Centrifugal Compressor According to Embodiment of Present Disclosure>

Figure 1:
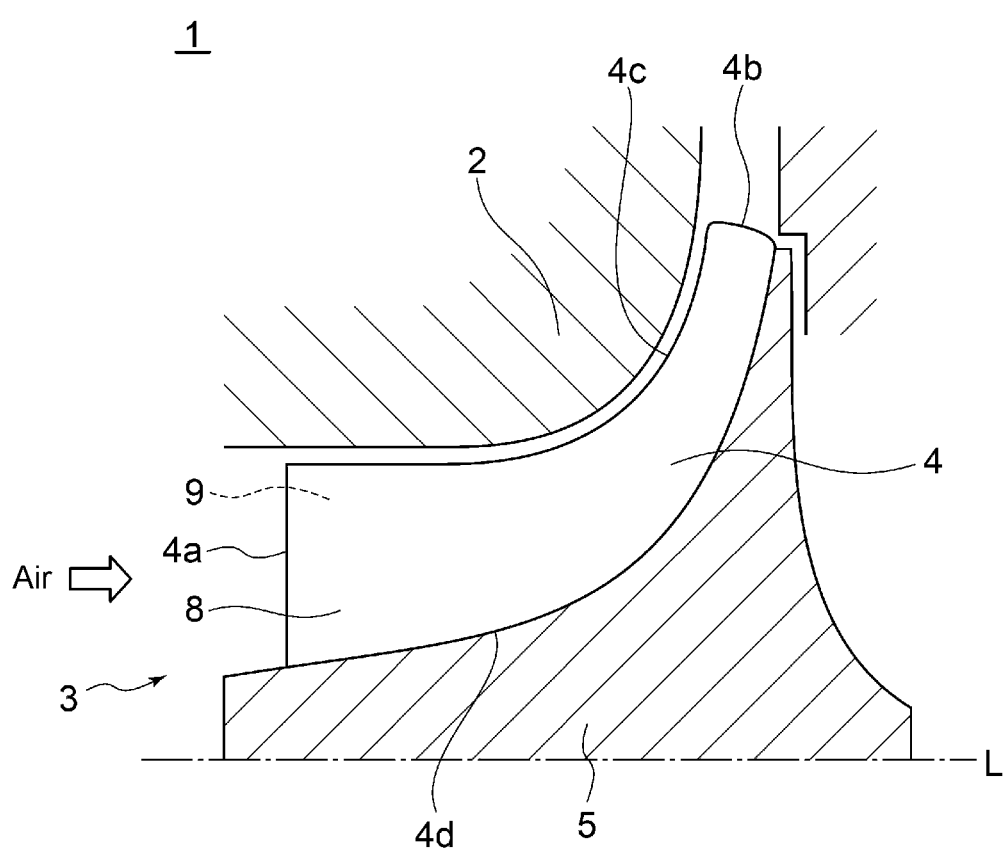
FIG. 1 is a cross-sectional view of a centrifugal compressor including an impeller according to an embodiment of the present disclosure.

As shown in FIG. 1, a centrifugal compressor 1 includes a housing 2, and an impeller 3 rotatably disposed around a rotational axis L in the housing 2. The impeller 3 includes a plurality of blades 4 (only one blade 4 is depicted in FIG. 1) disposed on a hub 5 at a predetermined interval in the circumferential direction. Each blade 4 has a leading edge 4a, a trailing edge 4b, a shroud-side end 4c facing the housing 2, and a hub-side end 4d connected to the hub 5. A pressure surface 8 and a suction surface 9 each serving as a blade surface of the blade 4 are defined by the leading edge 4a, the trailing edge 4b, the shroud-side end 4c, and the hub-side end 4d so as to extend between the leading edge 4a and the trailing edge 4b, respectively.

<Configuration of Impeller of Centrifugal Compressor According to Embodiment of Present Disclosure>

Figure 2:
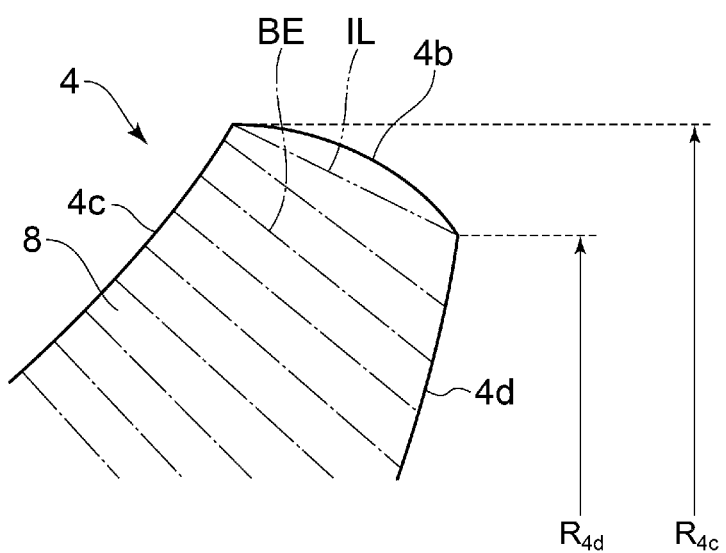
FIG. 2 is a view showing a part of a blade provided in the impeller according to an embodiment of the present disclosure.

FIG. 2 shows a part of the pressure surface 8 of the blade 4, and a blade element BE connecting the shroud-side end 4c and the hub-side end 4d is drawn on the pressure surface 8 by a single-dotted chain line. The pressure surface 8 is configured such that the blade element BE is linear. Although not shown in FIG. 2, the suction surface 9 (see FIG. 1) is also configured such that the blade element connecting the shroud-side end 4c and the hub-side end 4d is linear, as with the pressure surface 8. A curved surface, which is represented as the locus of a line segment when both ends of the line segment are continuously moved on two curves in a three-dimensional space, is called a ruled surface. The pressure surface 8 and the suction surface 9 each correspond to the ruled surface, and the blade element corresponds to the line segment.

Figure 3:
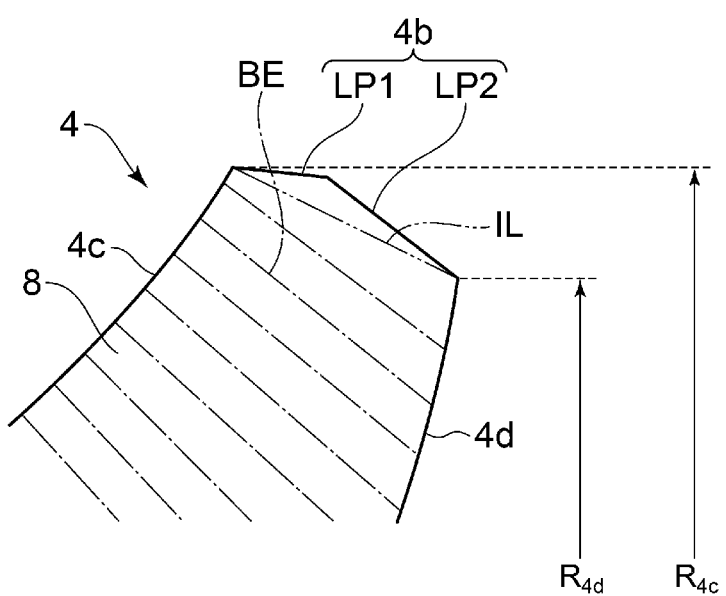
FIG. 3 is a view showing a part of a modified example of the blade provided in the impeller according to an embodiment of the present disclosure.
Figure 4:
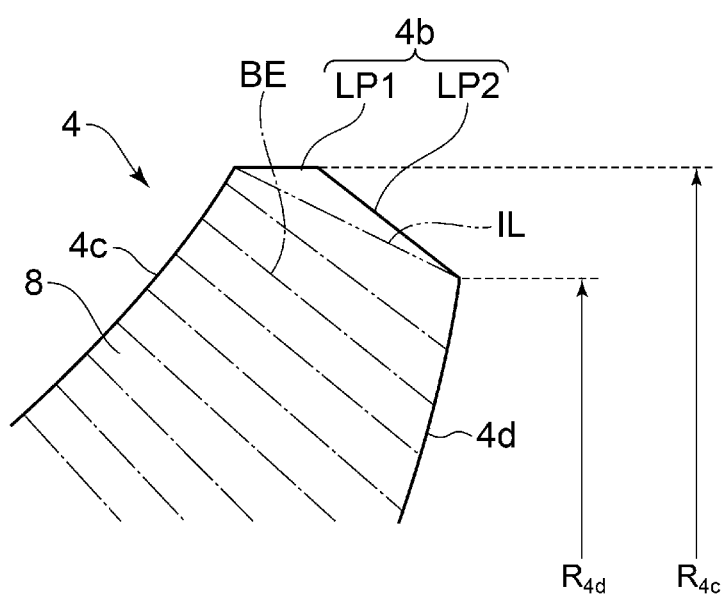
FIG. 4 is a view showing a part of another modified example of the blade provided in the impeller according to an embodiment of the present disclosure.

The trailing edge 4b is configured such that an outer diameter Rac at the shroud-side end 4c is larger than an outer diameter Rad at the hub-side end 4d. Further, the trailing edge 4b has a convex shape with respect to an imaginary straight line IL connecting the shroud-side end 4c and the hub-side end 4d in the trailing edge 4b. The convex shape of the trailing edge 4b with respect to the imaginary straight line IL may be a curved convex shape as shown in FIG. 2, or may be a convex shape which is formed from two linear portions, that is, a shroud-side linear portion LP1 extending from the shroud-side end 4c toward the hub-side end 4d and a hub-side linear portion LP2 extending from the hub-side end 4d toward the shroud-side end 4c as shown in FIG. 3. If the convex shape is formed from two linear portions, an outer diameter of the shroud-side linear portion LP1 can be made constant as shown in FIG. 4. Although not shown, a convex shape can also be formed from not less than three linear portions.

<Method for Producing Impeller of Centrifugal Compressor According to Embodiment of Present Disclosure>

Next, a method for producing the impeller 3 according to an embodiment of the present disclosure will be described. Since the method is the same as a method for producing an ordinary impeller except for an operation of forming the blade 4, the operation of forming the blade 4 will be described in detail below.

Figure 5:
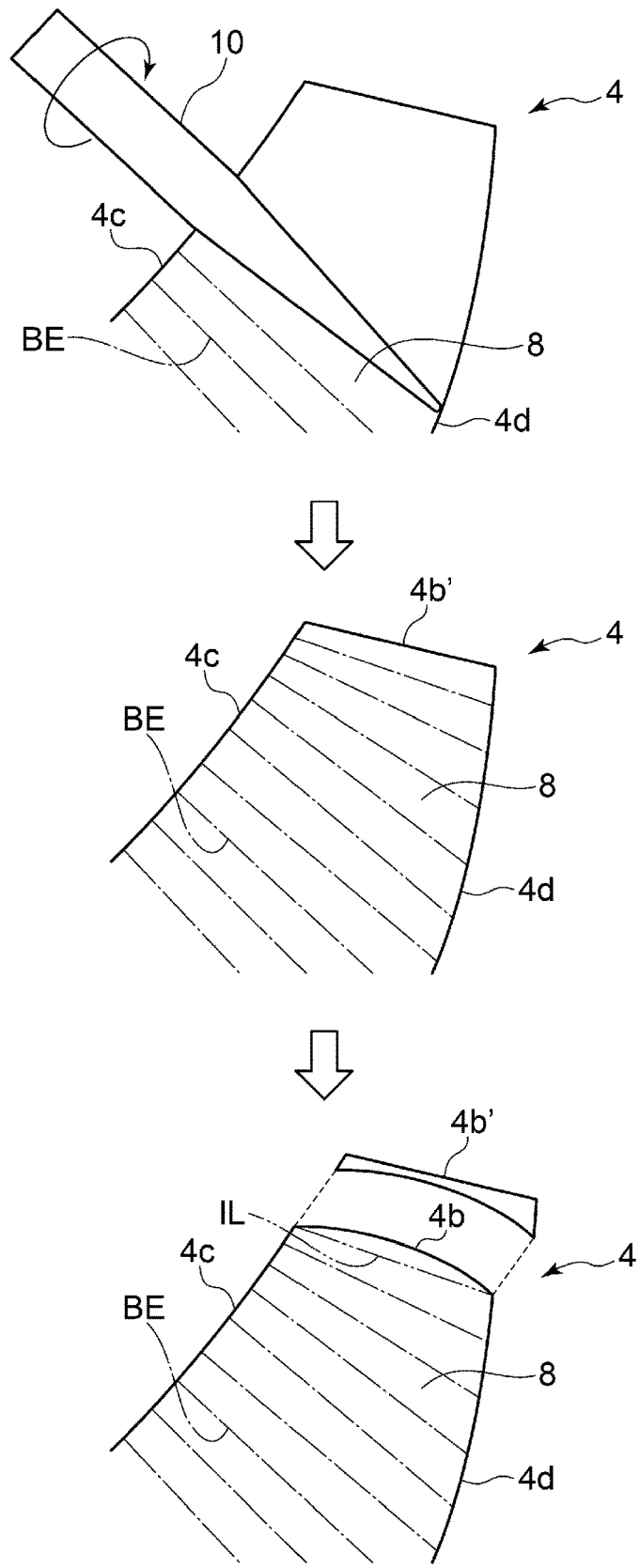
FIG. 5 is a view for describing a method for producing the impeller according to an embodiment of the present disclosure.

As shown in FIG. 5, the pressure surface 8 of the blade 4 is cut by a cutting tool 10. At this time, the pressure surface 8 is cut by cutting on a side surface of the cutting tool 10, that is, line cutting such that the cutting tool 10 intersects with the shroud-side end 4c and the hub-side end 4d. Although not shown, the suction surface 9 (see FIG. 1) is also subjected to line cutting by the cutting tool 10 in the same manner. Consequently, the blade element BE of the pressure surface 8 (and the suction surface 9) becomes linear.

Since the pressure surface 8 and the suction surface 9 are formed by line cutting, an end edge 4b' on a trailing edge side of the blade 4 after line cutting is linear so as to connect the shroud-side end 4c and the hub-side end 4d. Thus, after the pressure surface 8 and the suction surface 9 undergo line cutting, the trailing edge 4b is formed by removing a part of the blade 4 such that the trailing edge 4b has a convex shape with respect to the imaginary straight line IL connecting the shroud-side end 4c and the hub-side end 4d. A part of the blade 4 can be removed by any method, and may be removed by, for example, a lathe.

Thus, since the blade 4 is formed by removing a part of the end edge 4b' on the trailing edge side of the blade 4 after the pressure surface 8 and the suction surface 9 undergo line cutting, it is possible to shorten a cutting work time. If the convex shape of the trailing edge 4b is formed from two or more linear portions as shown in FIGS. 3 and 4, as compared with the case where the shape of the trailing edge 4b is curved as shown in FIG. 2, the work of removing a part of the blade 4 is simplified and the work time can be shortened, making it possible to further shorten the cutting work time.

<Operation of Centrifugal Compressor According to Embodiment of Present Disclosure>

Next, an operation of the centrifugal compressor 1 according to an embodiment will be described. As shown in FIG. 1, the impeller 3 is rotated by a rotation of a turbine (not shown). The air flowing into the centrifugal compressor 1 flows between the pressure surface 8 and the suction surface 9 of the adjacent blades 4 after passing through the leading edge 4a of the blade 4, and is compressed by the rotation of the impeller 3 while passing through the trailing edge 4b of the blade 4.

As shown in FIG. 6, in a centrifugal compressor 100 as a comparative example of the centrifugal compressor 1, a trailing edge 104b of a blade 104 is linear so as to connect a shroud-side end 104c and a hub-side end 104d. In this configuration, an air flow F' passing through the trailing edge 104 is inclined toward the hub side, and thus the air flow F' is biased toward the hub, resulting in occurrence of separation P on the shroud side. Such separation P tends to occur on the high flow rate side in particular.

By contrast, in the centrifugal compressor 1, since the trailing edge 4b has the curved convex shape, a flow f on the shroud side of an air flow F passing through the trailing edge 4 is less inclined to the hub side than the air flow F' of the centrifugal compressor 100. Thus, the air flow F is less biased toward the hub than the air flow F' of the centrifugal compressor 100, and as a result, the separation P is unlikely to occur on the shroud side. Thus, it is possible to suppress that the air flow F having passed through the trailing edge 4*b* is biased toward the hub on the high flow rate side in particular, and to reduce the possibility of the separation P occurring on the shroud side. Accordingly, it is possible to suppress the decrease in efficiency of the centrifugal compressor 1 on the high flow rate side.

In the centrifugal compressor 1 in FIG. 6, the trailing edge 4*b* has a curved convex shape (FIG. 2). However, it is possible to obtain the same effect, even the trailing edge 4*b* having the convex shape (FIG. 3 or 4) formed from not less than two or three linear portions. As shown in FIG. 4, in the configuration where the trailing edge 4*b* includes the shroud-side linear portion LP1 having the constant outer diameter, as compared with the configuration (FIG. 2 or 3) where the outer diameter of the trailing edge 4*b* decreases from the shroud-side end 4*c* toward the hub-side end 4*d*, since the portion where the outer diameter of the impeller 3 is large (shroud-side linear portion LP1) increases, it is possible to increase the pressure ratio, and it is possible to further increase the flow to the shroud side.

The contents described in the above embodiments would be understood as follows, for instance.

[1] An impeller of a centrifugal compressor according to one aspect includes: a plurality of blades (4) each of which has a leading edge (4*a*), a trailing edge (4*b*), a pressure surface (8) and a suction surface (9) extending between the leading edge (4*a*) and the trailing edge (4*b*), and a shroud-side end (4*c*) and a hub-side end (4*d*) defining the pressure surface (8) and the suction surface (9) together with the leading edge (4*a*) and the trailing edge (4*b*). The pressure surface (8) and the suction surface (9) are each configured such that a blade element (BE) connecting the shroud-side end (4*c*) and the hub-side end (4*d*) is linear. The trailing edge (4*b*) is configured such that an outer diameter (R+c) at the shroud-side end (4*c*) is larger than an outer diameter (R+d) at the hub-side end (4*d*), the trailing edge (4*b*) having a convex shape with respect to an imaginary straight line (IL) connecting the shroud-side end (4*c*) and the hub-side end (4*d*) in the trailing edge (4*b*).

With the impeller of the centrifugal compressor of the present disclosure, since the outer diameter of the trailing edge at the shroud-side end is larger than the outer diameter of the trailing edge at the hub-side end, it is possible to increase the pressure ratio. Further, since the trailing edge has the convex shape with respect to the imaginary straight line connecting the shroud-side end and the hub-side end in the trailing edge, it is possible to suppress that the flow having passed through the trailing edge is biased toward the hub on the high flow rate side, and to reduce the possibility of the separation occurring on the shroud side. Accordingly, it is possible to suppress the decrease in efficiency on the high flow rate side. Furthermore, since the pressure surface and the suction surface are each configured such that the blade element connecting the shroud-side end and the hub-side end is linear, the pressure surface and the suction surface can be line cut, making it possible to shorten the cutting work time.

[2] An impeller of a centrifugal compressor according to another aspect is the impeller of the centrifugal compressor as defined in [1], where the trailing edge (4*b*) has a curved convex shape with respect to the imaginary straight line (IL).

With such configuration, it is possible to achieve the same effect as the impeller of the centrifugal compressor as defined in [1].

[3] An impeller of a centrifugal compressor according to still another aspect is the impeller of the centrifugal compressor as defined in [1], where the trailing edge (4*b*) includes at least two linear portions (LP1, LP2).

With such configuration, the cutting time of the blades can be shortened as compared with the case where the trailing edge has the curved convex shape.

[4] An impeller of a centrifugal compressor according to yet another aspect is the impeller of the centrifugal compressor as defined in [3], where the at least two linear portions include: a shroud-side linear portion (LP1) extending from the shroud-side end (4*c*) toward the hub-side end (4*d*); and a hub-side linear portion (LP2) extending from the hub-side end (4*d*) toward the shroud-side end (4*c*), and the shroud-side linear portion (LP1) has a constant outer diameter.

With such configuration, since the shroud-side linear portion has the constant outer diameter, as compared with the configuration where the outer diameter of the trailing edge decreases from the shroud-side end toward the hub-side end, the portion where the outer diameter of the impeller is large (shroud-side linear portion) increases. Thus, it is possible to increase the pressure ratio, and it is possible to further increase the flow to the shroud side.

[5] A centrifugal compressor according to one aspect includes: the impeller (3) as defined in any one of [1] to [4].

With the centrifugal compressor of the present disclosure, it is possible to increase the pressure ratio, it is possible to suppress the decrease in efficiency on the high flow rate side, and it is possible to shorten the cutting work time in producing the impeller.

[6] A method for producing an impeller of a centrifugal compressor according to one aspect, the impeller (3) including a plurality of blades (4) each of which has a leading edge (4*a*), a trailing edge (4*b*), a pressure surface (8) and a suction surface (9) extending between the leading edge (4*a*) and the trailing edge (4*b*), and a shroud-side end (4*c*) and a hub-side end (4*d*) defining the pressure surface (8) and the suction surface (9) together with the leading edge (4*a*) and the trailing edge (4*b*), the method includes a step of forming each of the plurality of blades (4). The step of forming each of the plurality of blades (4) includes: a step of line cutting the pressure surface (8) and the suction surface (9) such that a blade element (BE) connecting the shroud-side end (4*c*) and the hub-side end (4*d*) is linear; and a step of forming the trailing edge (4*b*) by removing a part of the blade (4), such that the trailing edge (4*b*) has a convex shape with respect to an imaginary straight line (IL) connecting the shroud-side end (4*c*) and the hub-side end (4*d*) in the trailing edge (4*b*).

With the method for producing the impeller of the centrifugal compressor of the present disclosure, since the outer diameter of the trailing edge at the shroud-side end is larger than the outer diameter of the trailing edge at the hub-side end, it is possible to increase the pressure ratio. Further, since the trailing edge has the convex shape with respect to the imaginary straight line connecting the shroud-side end and the hub-side end in the trailing edge, it is possible to suppress that the flow having passed through the trailing edge is biased toward the hub on the high flow rate side, and to reduce the possibility of the separation occurring on the shroud side. Accordingly, it is possible to suppress the decrease in efficiency on the high flow rate side. Furthermore, since the pressure surface and the suction surface can be line cut, it is possible to shorten the cutting work time.

REFERENCE SIGNS LIST

1 Centrifugal compressor
3 Impeller

4 Blade
4a Leading edge
4b Trailing edge
4c Shroud-side end
4d Hub-side end
8 Pressure surface
9 Suction surface
BE Blade element
IL Imaginary straight line
$R_{4c}$ Outer diameter of trailing edge at shroud-side end
$R_{4d}$ Outer diameter of trailing edge at hub-side end

The invention claimed is:

1. A method for producing an impeller of a centrifugal compressor,
the impeller including a plurality of blades each of which has a leading edge, a trailing edge, a pressure surface and a suction surface extending between the leading edge and the trailing edge, and a shroud-side end and a hub-side end defining the pressure surface and the suction surface together with the leading edge and the trailing edge,
the method comprising a step of forming each of the plurality of blades,
wherein the step of forming each of the plurality of blades includes:
a step of line cutting the pressure surface and the suction surface such that a blade element connecting the shroud-side end and the hub-side end is linear; and
a step of forming the trailing edge by removing a part of the blade, such that the trailing edge has a convex shape with respect to an imaginary straight line connecting the shroud-side end and the hub-side end in the trailing edge.

* * * * *